US010746558B2

(12) United States Patent
Muldoon et al.

(10) Patent No.: US 10,746,558 B2
(45) Date of Patent: Aug. 18, 2020

(54) METHOD AND SYSTEM FOR ROUTING BASED ON A PREDICTED CONNECTIVITY QUALITY

(71) Applicant: GM GLOBAL TECHNOLOGY OPERATIONS LLC, Detroit, MI (US)

(72) Inventors: Steven E. Muldoon, Royal Oak, MI (US); Yiran Hu, Shelby Township, MI (US); Junfeng Zhao, Troy, MI (US); Vivek Vijaya Kumar, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 15/880,918

(22) Filed: Jan. 26, 2018

(65) Prior Publication Data

US 2019/0234750 A1 Aug. 1, 2019

(51) Int. Cl.
| | |
|---|---|
| G01C 21/34 | (2006.01) |
| H04W 24/08 | (2009.01) |
| H04W 40/20 | (2009.01) |
| H04W 4/40 | (2018.01) |
| H04W 4/024 | (2018.01) |
| H04W 4/46 | (2018.01) |
| H04W 4/44 | (2018.01) |
| H04W 36/32 | (2009.01) |

(52) U.S. Cl.
CPC ........ *G01C 21/3453* (2013.01); *H04W 4/024* (2018.02); *H04W 4/40* (2018.02); *H04W 24/08* (2013.01); *H04W 40/20* (2013.01); *H04W 4/44* (2018.02); *H04W 4/46* (2018.02); *H04W 36/32* (2013.01)

(58) Field of Classification Search
CPC .................................................. G01C 21/3453
USPC ......................................................... 701/410
See application file for complete search history.

(56) References Cited

U.S. PATENT DOCUMENTS

| | | | | |
|---|---|---|---|---|
| 8,213,388 | B2* | 7/2012 | Pathan | H04W 28/26 370/332 |
| 8,311,741 | B1* | 11/2012 | Lawther | G01C 21/3461 701/527 |
| 2005/0037775 | A1* | 2/2005 | Moeglein | G01S 5/0242 455/456.1 |
| 2009/0247137 | A1* | 10/2009 | Awad | H04M 3/2227 455/418 |
| 2010/0088025 | A1* | 4/2010 | Garg | G01C 21/3461 701/533 |
| 2013/0024107 | A1* | 1/2013 | Xie | G01C 21/3461 701/423 |
| 2014/0067257 | A1* | 3/2014 | Dave | G01C 21/3461 701/423 |
| 2014/0257695 | A1* | 9/2014 | Annapureddy | G01C 21/00 701/537 |

(Continued)

*Primary Examiner* — Jason C Olson
(74) *Attorney, Agent, or Firm* — Cantor Colburn LLP

(57) ABSTRACT

A system and method for routing based on a predicted connectivity quality is disclosed. The method includes receiving, by a controller, map information corresponding to a geographical area. The method also includes receiving, by the controller, wireless connectivity information corresponding to the geographical area. The method also includes generating output data of at least one route between a starting location and a destination location within the geographical area. The generating is based on the wireless connectivity information.

16 Claims, 2 Drawing Sheets

(56) References Cited

U.S. PATENT DOCUMENTS

| | | | |
|---|---|---|---|
| 2016/0282129 A1* | 9/2016 | Wang | H04B 17/318 |
| 2018/0023968 A1* | 1/2018 | Stuchfield | G01C 21/3453 |
| | | | 701/416 |
| 2018/0146388 A1* | 5/2018 | Lee | H04W 52/10 |
| 2018/0176784 A1* | 6/2018 | Carter | H04W 64/00 |
| 2019/0041225 A1* | 2/2019 | Winkle | G01C 21/3453 |
| 2019/0041227 A1* | 2/2019 | Shetty | G01C 21/3461 |
| 2019/0043251 A1* | 2/2019 | Winkle | H04B 17/3913 |

* cited by examiner

METHOD AND SYSTEM FOR ROUTING BASED ON A PREDICTED CONNECTIVITY QUALITY

STATEMENT REGARDING FEDERALLY SPONSORED RESEARCH OR DEVELOPMENT

This invention was made with U.S. Government support under Agreement No. DE-AR0000790 awarded by the Department of Energy, Advanced Research Projects Agency-Energy project (NEXTCAR Program). The U.S. Government may have certain rights in this invention.

INTRODUCTION

The subject embodiments relate to performing routing based on a connectivity quality that a vehicle is predicted to experience when connecting to wireless communication. Specifically, one or more embodiments can be directed to generating route data that corresponds to at least one route for a vehicle based on a connectivity quality that the vehicle is predicted to experience while traveling along the at least one route, for example.

Vehicles that are able to connect to wireless communication can receive instructions that enable the vehicles to perform eco-driving functions. Eco-driving refers to a set of techniques that are used by drivers and/or vehicles to reduce fuel consumption. Connected vehicles can receive instructions or information used for operating the vehicles at a high efficiency on the road, which can include fuel-saving techniques, for example.

SUMMARY

In one exemplary embodiment, a method includes receiving, by a controller, map information corresponding to a geographical area. The method also includes receiving, by the controller, wireless connectivity information corresponding to the geographical area. The method also includes generating output data of at least one route between a starting location and a destination location within the geographical area. The generating is based on the wireless connectivity information.

In another exemplary embodiment, the generating is based on a determined quality of wireless connectivity for a vehicle that travels along the at least one route.

In another exemplary embodiment, the generating is based on at least one of a determined travel time, a determined travel distance, and a determined average travel speed for a vehicle that travels along the at least one route.

In another exemplary embodiment, the wireless connectivity information includes quality-of-service measurements.

In another exemplary embodiment, the vehicle corresponds to a connected-automated vehicle that is configured to receive data for eco-driving via wireless communication.

In another exemplary embodiment, the wireless connectivity information includes measurements of vehicle-to-infrastructure connectivity and measurements of vehicle-to-vehicle connectivity.

In another exemplary embodiment, the quality-of-service measurements include measurements corresponding to at least one of a transmission latency, an availability of service, an error rate, a transfer rate, and a signal jitter.

In another exemplary embodiment, the received wireless connectivity information includes information about identified nodes that provide wireless connectivity.

In another exemplary embodiment, the starting location corresponds to a current vehicle location.

In another exemplary embodiment, the generated at least one route corresponds to a route with an optimized determined cost. The cost is based on a determined travel time and a determined amount of fuel used.

In another exemplary embodiment, a system within a vehicle includes an electronic controller configured to receive map information corresponding to a geographical area. The electronic controller is also configured to receive wireless connectivity information corresponding to the geographical area. The electronic controller is also configured to generate output data of at least one route between a starting location and a destination location within the geographical area. The generating is based on the wireless connectivity information.

In another exemplary embodiment, the generating is based on a determined quality of wireless connectivity for a vehicle that travels along the at least one route.

In another exemplary embodiment, the generating is based on at least one of a determined travel time, a determined travel distance, and a determined average travel speed for a vehicle that travels along the at least one route.

In another exemplary embodiment, the wireless connectivity information includes quality-of-service measurements.

In another exemplary embodiment, the vehicle corresponds to a connected-automated vehicle that is configured to receive data for eco-driving via wireless communication.

In another exemplary embodiment, the wireless connectivity information includes measurements of vehicle-to-infrastructure connectivity and measurements of vehicle-to-vehicle connectivity.

In another exemplary embodiment, the quality-of-service measurements include measurements corresponding to at least one of a transmission latency, an availability of service, an error rate, a transfer rate, and a signal jitter.

In another exemplary embodiment, the received wireless connectivity information includes information about identified nodes that provide wireless connectivity.

In another exemplary embodiment, the starting location corresponds to a current vehicle location.

In another exemplary embodiment, the generated at least one route corresponds to a route with an optimized determined cost. The cost is based on a determined travel time and a determined amount of fuel used.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
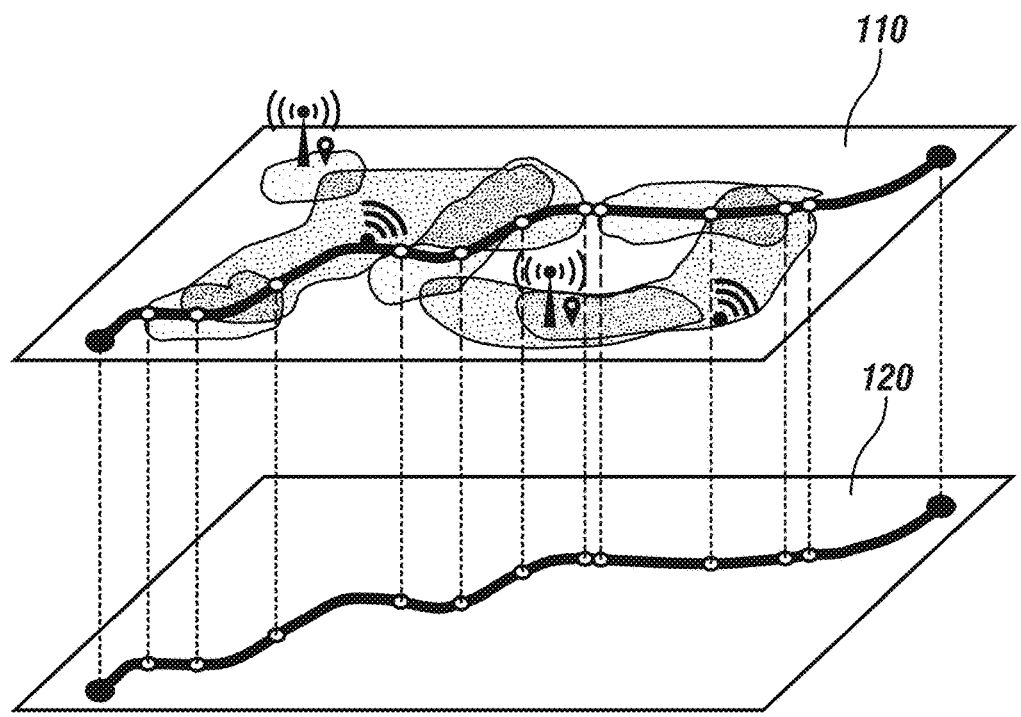
FIG. 1 illustrates example connectivity information and example map information in accordance with one or more embodiments.

The following description is merely exemplary in nature and is not intended to limit the present disclosure, its application or uses. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments are directed to a method of generating output data of at least one route for a vehicle. The route connects a starting location to a destination location. The conventional approaches generally performed routing by generating routes that are determined to be the most efficient. For example, the conventional approaches generally generated routes which allow a vehicle to travel the fastest, to travel the least amount of distance, or to travel to a destination location in a least amount of time. The conventional approaches generated routes without giving any consideration to the wireless connectivity along the generated routes.

In contrast to the conventional approaches, one or more embodiments is directed to a method of routing a vehicle where the routing is based on a quality of connectivity that the vehicle is predicted to experience when connecting to wireless communication. One or more embodiments generate at least one route based on the predicted quality of connectivity for the vehicle along the route. One or more embodiments can predict/determine the quality of connectivity that the vehicle will experience based on one or more quality-of-service (QoS) measurements. By performing routing based on a predicted quality of connectivity, one or more embodiments can generate routes that provide higher connectivity for the vehicle, and thus the vehicle can more readily connect to wireless communication when traveling along such routes.

As such, one or more embodiments can predict a quality of wireless connectivity, and one or more embodiments use the predicted/determined quality of wireless connectivity in order to generate routes that are more likely to provide a fast and consistent transfer of wireless communication to the vehicle. By providing a faster transfer of wireless communication to the vehicle, one or more embodiments can enable the vehicle to receive predictive information for performing eco-driving, for example.

Vehicles that are automated and connected to wireless communication can be referred to as connected-automated vehicles (CAVs). CAVs generally try to receive persistent and low-latency wireless communication. CAVs need to receive this wireless communication in order to enable different features and functions. With one or more embodiments, in order to connect to wireless communication, a vehicle can select, switch, or blend between different sources that provide wireless communication. These different sources can provide wireless communication in the form of cellular communication and/or dedicated short range communication, for example. As a vehicle travels along a route, the vehicle can predict, measure, and select a source that provides the vehicle with the best wireless connectivity.

As described above, when a vehicle can connect to wireless communication with a sufficient quality of connectivity (and/or with a sufficient availability of connectivity), then the vehicle is more likely to successfully perform useful functions that are enabled by the wireless communication. For example, by successfully connecting to wireless communication, the vehicle can perform eco-driving by using fuel-saving algorithms and by using predictive vehicle control applications. By using such algorithms and applications, the vehicle can operate at an improved efficiency when travelling on a generated vehicle route.

In addition to performing functions relating to eco-driving, CAVs can also receive instructions for performing functions relating to active safety. Active safety functions can enable a vehicle to more safely travel through blind intersections, and these functions can allow the vehicle to perform forward crash detection, for example. When a quality of connectivity is improved, a vehicle experiences a lower latency when receiving wireless communication. With this lower latency, the vehicle can more quickly determine environmental information and can more readily detect an upcoming stopping condition, for example. By detecting an upcoming stopping condition more quickly, one or more embodiments can perform stopping of the vehicle at a greater stopping distance. In general, with a higher quality of connectivity, and with a lower latency, one or more embodiments can enhance or extend vehicle functions.

Further, in addition to eco-driving functions and vehicle safety functions, a connected vehicle can also provide occupants with information and entertainment functions. Vehicle occupants can consider information and entertainment functions to be important when travelling within the vehicle. In order to provide satisfactory information and entertainment functions, one or more embodiments can choose routes that provide the vehicle with sufficient connectivity to wireless communication. With one or more embodiments, if a vehicle anticipates travelling along a portion of a route that will provide poor connectivity to wireless communication, then the vehicle can perform pre-fetch processes to fetch sufficient data before the vehicle reaches the portion of the route that exhibits poor connectivity. As such, when the vehicle is travelling along the portion of the route with poor connectivity, the vehicle can use the data that was pre-fetched in order to provide vehicle occupants with continuous access to information/entertainment.

FIG. 1 illustrates example connectivity information 110 and example map information 120 in accordance with one or more embodiments. A processor can receive different parameters (i.e., parametric information) that can be used to determine a quality of connectivity for different locations. The determined quality-of-connectivity of different locations, which is reflected by connectivity information 110, can be combined/transposed with map information 120. As such, one or more embodiments can determine a quality of connectivity for each location that is represented on a map of map information 120.

Figure 2:
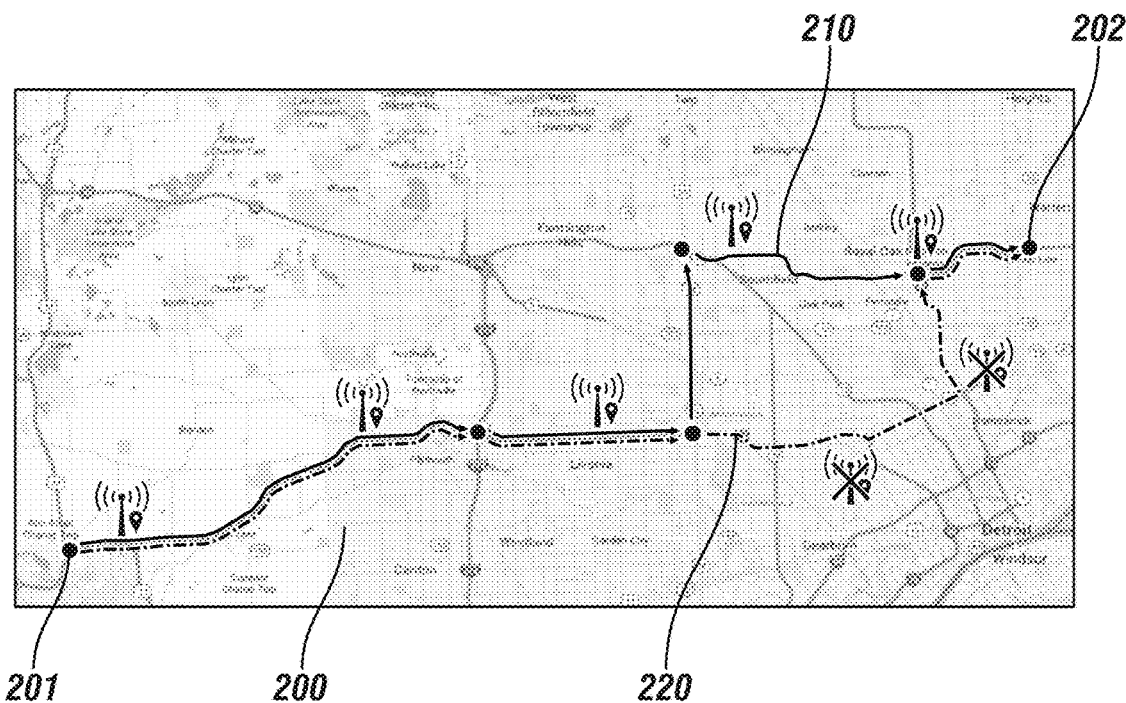
FIG. 2 illustrates combining example connectivity information and example map information in accordance with one or more embodiments.

FIG. 2 illustrates combining example connectivity information and example map information in accordance with one or more embodiments. One or more embodiments can use a routing methodology on the map information to generate at least one route from a starting location to a destination location. The starting location can be the current location of a vehicle, for example. Because a quality of connectivity is able to be determined for each location that is reflected on the map (and that is reflected within the map information), one or more embodiments can also determine the quality of connectivity along each generated route. Referring to FIG. 2, map 200 displays a first route 210 and a second route 220 between starting location 201 and destination location 202. By using connectivity data that is associated with map 200, one or more embodiments can determine that wireless connectivity is maintained along the entirety of first route 210, and wireless connectivity is not maintained along the entirety of second route 220. By using parametric information in conjunction with map information, one or more embodiments can determine a quality of connectivity along each generated route.

In one example, when using a routing methodology to generate the at least one route, the route methodology can generate a plurality of route segments that connect a starting point to a destination point. One or more embodiments can determine a quality of connectivity for each of the route segments, for example. With one or more embodiments, the map information can be obtained from a cloud service that includes map and integrated traffic information. For example, the cloud service can be configured to function as a conventional navigation system.

The parametric information (and thus the quality of connectivity) of a given location on a map can be based on the sources of wireless communication that provide connectivity for the given location. As such, one or more embodiments can determine the parametric information and/or the quality-of-connectivity information of a location by identifying the sources of wireless communication that serve the location. Specifically, for a given location or for a given route, one or more embodiments can determine nodes that provide wireless connectivity which are present at the given location or along the given route.

For example, one or more embodiments can identify nodes that provide vehicle-to-infrastructure (V2I) communication for a location. The nodes can be determined based on information regarding installed infrastructure and/or can be based on crowd-sourced information. In one example, one or more embodiments can identify radio-frequency transmitters (which perform cellular communication and/or dedicated short-range communication) that provide wireless connectivity for the location. By identifying the nodes that provide wireless communication, one or more embodiments can determine which locations on the map have wireless connectivity and can determine which locations do not have wireless connectivity.

For the locations that have wireless connectivity, one or more embodiments can determine a quality of connectivity by processing and analyzing quality-of-service (QoS) parameters. These QoS parameters can include measurements relating to transmission latency, an availability of service, error rates, transfer rates, signal jitter, real-time message retries, and/or a received signal strength (RSS). One or more embodiments can also use historical and/or crowd-sourced connectivity-quality statistics to determine the quality of connectivity. In order to determine a quality of connectivity, one or more embodiments can consider a plurality of parameters where a value or a weighting is assigned to each wireless connectivity parameter.

If a plurality of possible routes exist (for reaching a destination location), then one or more embodiments can choose a path that minimizes a determined cost. The determined cost can be can be based on factors such as, but not limited to, a travel time, a distance travelled, an average travel speed, an amount of fuel used, and/or a given connectivity quality. Each factor can be weighted differently, where an increased travel time corresponds to an increased cost, an increased distance travelled corresponds to an increased cost, a lower average travel speed corresponds to an increased cost, a higher amount of fuel used corresponds to an increased cost, and a lower connectivity quality corresponds to an increased cost, for example. Finally, one or more embodiments can receive feedback information, and one or more embodiments can modify how the costs are determined based on the received feedback information.

Figure 3:
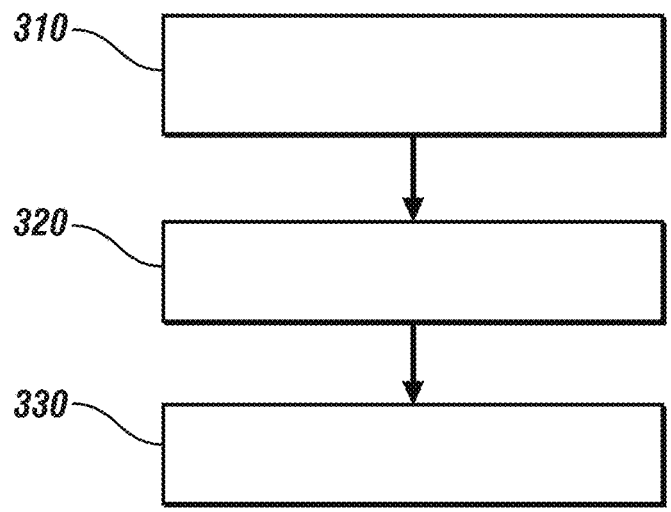
FIG. 3 depicts a flowchart of a method in accordance with one or more embodiments.

FIG. 3 depicts a flowchart of a method in accordance with one or more embodiments. The method of FIG. 3 can perform routing based on a predicted connectivity quality. The method of FIG. 3 can be performed by a controller of a connected vehicle, for example. The method can include, at block 310, receiving, by the controller, map information corresponding to a geographical area. The method can also include, at block 320, receiving, by the controller, wireless connectivity information corresponding to the geographical area. The method can also include, at block 330, generating output data of at least one route between a starting location and a destination location within the geographical area, wherein the generating is based on the wireless connectivity information.

Figure 4:
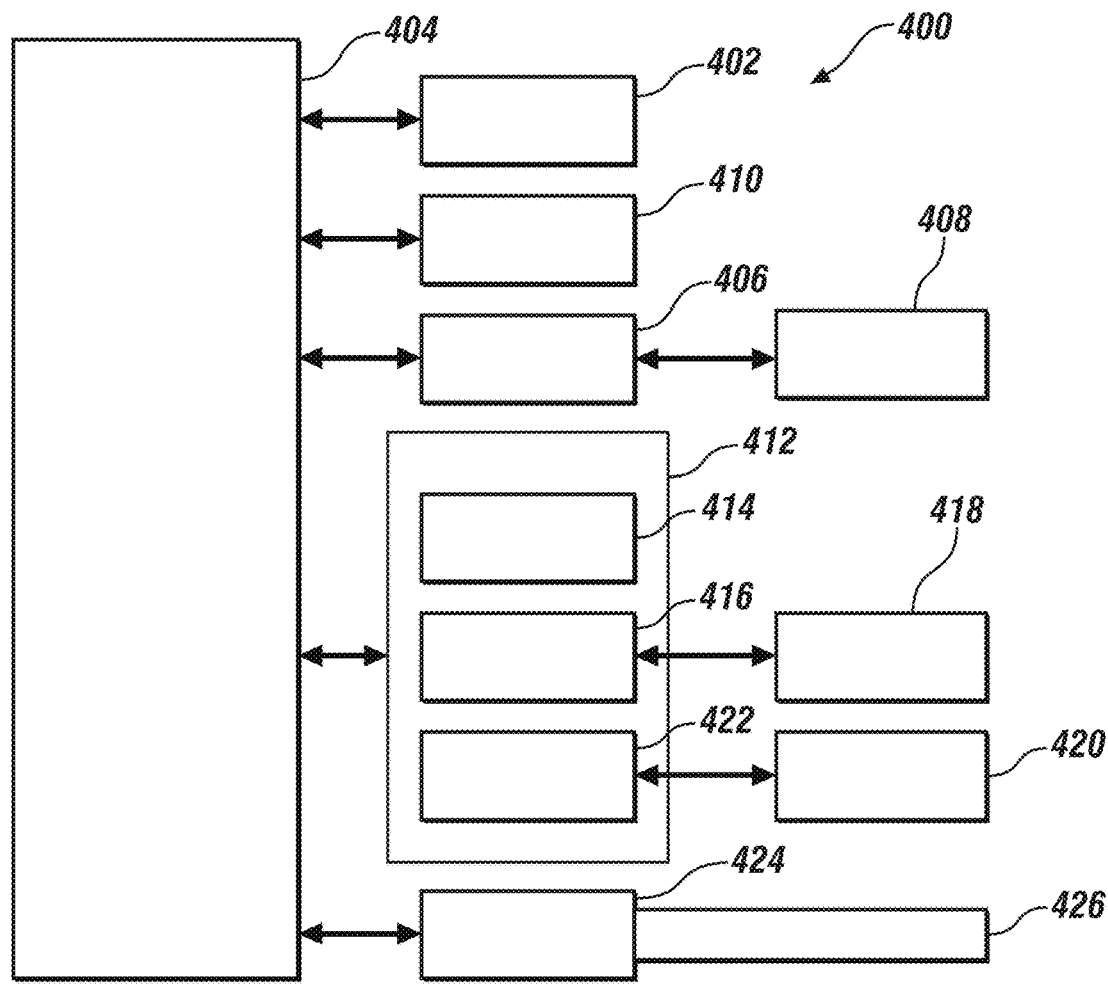
FIG. 4 depicts a high-level block diagram of a computing system, which can be used to implement one or more embodiments.

FIG. 4 depicts a high-level block diagram of a computing system 400, which can be used to implement one or more embodiments. Computing system 400 can correspond to, at least, a system that is configured to perform routing based on a predicted connectivity quality, for example. The system can be a part of a system of electronics within a connected vehicle. With one or more embodiments, computing system 400 can correspond to an electronic control unit (ECU) of a vehicle. Computing system 400 can be used to implement hardware components of systems capable of performing methods described herein. Although one exemplary computing system 400 is shown, computing system 400 includes a communication path 426, which connects computing system 400 to additional systems (not depicted). Computing system 400 and additional system are in communication via communication path 426, e.g., to communicate data between them.

Computing system 400 includes one or more processors, such as processor 402. The above-described method of one or more embodiments can be implemented by one or more processors. The one or more processors can be centralized and/or distributed across different computing systems. In the example of FIG. 4, processor 402 is connected to a communication infrastructure 404 (e.g., a communications bus, cross-over bar, or network). Computing system 400 can include a display interface 406 that forwards graphics, textual content, and other data from communication infrastructure 404 (or from a frame buffer not shown) for display on a display unit 408. Computing system 400 also includes a main memory 410, preferably random access memory (RAM), and can also include a secondary memory 412. There also can be one or more disk drives 414 contained within secondary memory 412. Removable storage drive 416 reads from and/or writes to a removable storage unit 418. As will be appreciated, removable storage unit 418 includes a computer-readable medium having stored therein computer software and/or data.

In alternative embodiments, secondary memory 412 can include other similar means for allowing computer programs or other instructions to be loaded into the computing system. Such means can include, for example, a removable storage unit 420 and an interface 422.

In the present description, the terms "computer program medium," "computer usable medium," and "computer-readable medium" are used to refer to media such as main memory 410 and secondary memory 412, removable storage drive 416, and a disk installed in disk drive 414. Computer programs (also called computer control logic) are stored in main memory 410 and/or secondary memory 412. Computer programs also can be received via communications interface 424. Such computer programs, when run, enable the computing system to perform the features discussed herein. In particular, the computer programs, when run, enable processor 402 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the embodiments not be limited to the particular embodiments disclosed, but will include all embodiments falling within the scope of the application.

What is claimed is:

1. A method, the method comprising:
    receiving, by a controller, map information corresponding to a geographical area;
    for locations within the geographical area, identifying nodes by infrastructure that provide wireless communication to those locations based upon crowd-sourced information;
    determining which of the locations have wireless connectivity based on the node infrastructure;
    determining quality of wireless connectivity information of the locations determined to have wireless connectivity, based on quality-of-service measurements including transmission latency from crowd-sourced connectivity-quality statistics;
    receiving, by the controller, the quality of wireless connectivity information; and
    generating output data of at least one route between a starting location and a destination location within the geographical area, wherein the generating is based on the quality of wireless connectivity information.

2. The method of claim 1, wherein the generating is based on determined quality of wireless connectivity information for a vehicle that travels along the at least one route.

3. The method of claim 1, wherein the generating is based on at least one of a determined travel time, a determined travel distance, and a determined average travel speed for a vehicle that travels along the at least one route.

4. The method of claim 2, wherein the vehicle corresponds to a connected-automated vehicle that is configured to receive data for eco-driving via wireless communication.

5. The method of claim 1, wherein the wireless connectivity information comprises measurements of vehicle-to-infrastructure connectivity and measurements of vehicle-to-vehicle connectivity.

6. The method of claim 1, wherein the quality-of-service measurements comprise measurements corresponding to at least one of an error rate, a transfer rate, and a signal jitter.

7. The method of claim 1, wherein the starting location corresponds to a current vehicle location.

8. The method of claim 1, wherein the generated at least one route corresponds to a route with an optimized determined cost, wherein the cost is based on a determined travel time and a determined amount of fuel used.

9. A system within a vehicle, comprising:
    an electronic controller configured to:
    receive map information corresponding to a geographical area;
    for locations within the geographical area, identify nodes by infrastructure that provide wireless communication to those locations based upon crowd-sourced information;
    determine which of the locations have wireless connectivity based on the node infrastructure;
    determine quality of wireless connectivity information of the locations determined to have wireless connectivity, based on quality-of-service measurements including transmission latency from crowd-sourced connectivity-quality statistics;
    receive the quality of wireless connectivity information; and
    generate output data of at least one route between a starting location and a destination location within the geographical area, wherein the generating is based on the quality of wireless connectivity information.

10. The system of claim 9, wherein the generating is based on determined quality of wireless connectivity information for a vehicle that travels along the at least one route.

11. The system of claim 9, wherein the generating is based on at least one of a determined travel time, a determined travel distance, and a determined average travel speed for a vehicle that travels along the at least one route.

12. The system of claim 10, wherein the vehicle corresponds to a connected-automated vehicle that is configured to receive data for eco-driving via wireless communication.

13. The system of claim 9, wherein the wireless connectivity information comprises measurements of vehicle-to-infrastructure connectivity and measurements of vehicle-to-vehicle connectivity.

14. The system of claim 9, wherein the quality-of-service measurements comprise measurements corresponding to at least one of an error rate, a transfer rate, and a signal jitter.

15. The system of claim 9, wherein the starting location corresponds to a current vehicle location.

16. The system of claim 9, wherein the generated at least one route corresponds to a route with an optimized determined cost, wherein the cost is based on a determined travel time and a determined amount of fuel used.

* * * * *